United States Patent [19]
Buckland

[11] Patent Number: 5,999,971
[45] Date of Patent: Dec. 7, 1999

[54] APPARATUS AND METHOD FOR IDENTIFYING CLIENTS ACCESSING NETWORK SITES

[75] Inventor: Bruce H. Buckland, Concord, Mass.

[73] Assignee: Inforonics, Inc., Littleton, Mass.

[21] Appl. No.: 09/103,679

[22] Filed: Jun. 23, 1998

Related U.S. Application Data

[60] Provisional application No. 60/048,946, Jun. 25, 1997.

[51] Int. Cl.$^6$ ................................................. G06F 13/00
[52] U.S. Cl. .......................................... 709/218; 709/203
[58] Field of Search .................. 395/200.46, 200.47, 395/200.48; 709/217, 218, 219, 203

[56] References Cited

U.S. PATENT DOCUMENTS

| | | | |
|---|---|---|---|
| 5,560,008 | 9/1996 | Johnson et al. | 709/300 |
| 5,708,780 | 1/1998 | Levergood et al. | 709/229 |
| 5,796,952 | 8/1998 | Davis et al. | 709/224 |
| 5,862,325 | 1/1999 | Reed et al. | 709/201 |
| 5,875,296 | 2/1999 | Shi et al. | 713/202 |

FOREIGN PATENT DOCUMENTS

WO 9642041  12/1996  WIPO.

OTHER PUBLICATIONS

Harold J. Highland, "The Cookie Monster Data Privacy," EDPACS, vol. 24, No. 6, Dec. 1996, pp. 16–18, XP002079209.

Primary Examiner—Zarni Maung
Assistant Examiner—Kenneth R. Coulter
Attorney, Agent, or Firm—Bromberg & Sunstein LLP

[57] ABSTRACT

An apparatus for identifying a client accessing a first network site utilizes a control site to maintain information relating to the client. To that end, in response to receipt of a request from the client to access the first network site, it is determined if the client includes a first site data block. If it is determined that the client does not include the first site data block, then the control site is controlled to produce a control site data block having both control site identification data and a client identifier. The control site data block then is transmitted from the control site to the client In a similar manner, the client identifier is transmitted from the control site to the first network site. Upon receipt of the client identifier by the first network site, the first network site is controlled to transmit the first site data block to the client. The first site data block may have both the client identifier and first site identification data.

94 Claims, 5 Drawing Sheets

5,999,971

APPARATUS AND METHOD FOR IDENTIFYING CLIENTS ACCESSING NETWORK SITES

PRIORITY

This application claims priority from provisional application Ser. No. 60/048,946, filed Jun. 25, 1997, entitled "MULTIPLE SITE DATA SYNCHRONIZATION" and bearing attorney docket number 2098/101, which is incorporated herein, in its entirety, by reference.

FIELD OF THE INVENTION

The invention generally relates to computer networks and, more particularly, the invention relates to identifying and sharing information relating to computer devices accessing other computer devices in a computer network.

BACKGROUND OF THE INVENTION

The World Wide Web is a collection of servers connected to the Internet that utilize the Hypertext Transfer Protocol ("HTTP"). HTTP is a known application protocol that provides users with access to documents (e.g., web pages at a web site) written in a standard mark-up page description language known as Hypertext Markup Language ("HTML"). HTTP is used to transmit HTML web pages between a remote computer (e.g., a server) and a client computer in a form that is understandable to browser software (e.g., Netscape Navigator™, available from Netscape Communications Corporation of Mountain View, California) executing on the client computer.

A web site can be customized to a specific user of a client computer (hereinafter "client") when information about that client is available to the site. For example, if a web site has access to a record indicating that a client is a sports fan, then the site may be specially configured to display a sports advertisement whenever that client accesses the site. Such functionality can encourage sports sponsors for the web site, consequently increasing site revenue.

To that end, the World Wide Web utilizes "cookies" to provide client information to a web site. As is known in the art, a cookie is a data block that is transmitted to a client browser by a web site. Upon receipt, the browser stores the cookie in a given manner such as, for example, in a text file called "cookie.txt." The cookie is transmitted back to the web site each time the browser requests access to a web page from the web site.

Among other things, cookies commonly include data identifying the client requesting access. When used in this manner, such data may be utilized to access a database at the web site to ascertain relatively large quantities of data about the client. Since the World Wide Web includes many interconnected servers, many databases can have the same information relating to a single client. The art has responded to this unnecessary information duplication by locating information on shared central computer systems that may be accessed by two or more web sites. More particularly, whenever accessed by a client, any one of several web sites can access a single database on a shared central computer system to obtain stored information (if any) relating to the client. Information thus is shared by each web site that has access to the registration system.

One known method of implementing a shared central computer system as described above requires that the central computer system web site upload a cookie to a client while the client is accessing one of the member web sites (i.e., while the client is in the member web site domain). One such system is the DOUBLE CLICK NETWORK™ system, available from DoubleClick Inc., of New York, N.Y. This type of system is ineffective, however, if a browser is configured to receive cookies from no other domains other than the domain in which the browser is currently accessing. For example, when accessing a web site in a domain "site.com", a browser configured to receive cookies from no more than one domain cannot receive cookies from a domain "registration.com." Use of a browser configured in such a manner undesirably eliminates the functionality of such a centralized client information system.

SUMMARY OF THE INVENTION

In accordance with one aspect of the invention, an apparatus for identifying a client accessing a first network site utilizes a control site to maintain information relating to the client. To that end, in response to receipt of a request from the client to access the first network site, it is determined if the client includes a first site data block. If it is determined that the client does not include the first site data block, then the control site is controlled to produce a control site data block having both control site identification data and a client identifier. The control site data block then is transmitted from the control site to the client. In a similar manner, the client identifier is transmitted from the control site to the first network site. Upon receipt of the client identifier by the first network site, the first network site is controlled to transmit the first site data block to the client. In preferred embodiments, the first site data block has both the client identifier and first site identification data.

In some embodiments, the first network site is a World Wide Web site in a first network site domain, the client includes a browser, and the first site data block is a cookie. The client thus may be directed to the first network site domain to receive the cookie from the first network site. In other embodiments, the control site is a World Wide Web site in a control site domain, and the control site data block is a cookie. Similar to when receiving the cookie from the first network site, the client may be directed to the client site domain to receive the cookie from the control site. The client identifier may include an Internet protocol address ("IP address").

In another aspect of the invention, if it is determined that the client includes the first site data block, then a copy of the first site data block may be retrieved from the client. The client identifier then may be extracted from the first site data block, and transmitted from the first network site to the control site. The client identifier then may be used to retrieve client information from a storage medium associated with the control site. Once retrieved, the client information may be transmitted from the control site to the first network site.

In some embodiments of the invention, the first network site is in a first domain and the control site is in a control domain. In this embodiment, the first domain is distributed across at least two servers. Moreover, the control site is implemented on a server that also includes a portion of the distributed first network site. The control data block is transmitted when the client is in the control domain, and the first site data block is transmitted when the client is in the first domain.

In still other embodiments of the invention, if it is determined that the client includes the first site data block, then the first network site is controlled to retrieve a copy of the first site data block from the client. In this embodiment, however, the first site data block itself includes the client information. The client identifier and client identifier then may be extracted from the first site data block.

In other aspects of the invention, a second network site is in communication with the network and receives an access request from the client. In response to the access request, it is determined if the client includes a second site data block. If it is determined that the client does not include the second site data block, then a message with the client identifier is transmitted to the control site. The control site then is controlled to utilize the identifier to locate client information. The located client information then is transmitted from the control site to the second network site.

In accordance with another aspect of the invention, an apparatus for identifying a client accessing a first network site also utilizes a control site to maintain information relating to the client. In this aspect of the invention, however, the apparatus generates messages that, when received by the first network site, enable certain processes to be performed by the first network site. To that end, the control site receives a first message from the first network site indicating the at the client does not include a first site data block. After receipt, the control site produces a control site data block having control site identification data and a client identifier. The control site data block then may be transmitted from the control site to the client. A second message then may be generated for transmission from the control site to the first network site. In preferred embodiments, the second message includes the client identifier and commands for execution by the first network site. The commands are selected so that after the commands are received by the first network site, the first network responsively transmits the first site data block to the client. The first site data block preferably has both the client identifier and first site identification data. In some embodiments, the commands include data that is utilized as input to a function at the first network site.

In a manner similar to the other aspects of the invention, yet another aspect of the invention identifies a client accessing a first network site by utilizing a control site to maintain information relating to the client. This aspect, however, generates messages that, when received by the control site, enable certain processes to be performed by the control site. To that end, a request from the client to access the first network site is received by the first network site. In response to the request, it is determined if the client includes a first site data block. If it is determined that the client does not include the first site data block, then an initial message is generated having control commands for execution by the control site. The control commands may be selected so that when executed by the control site, the control site first produces a control site data block having both control site identification data and a client identifier, and then, once produced, transmits the control site data block to the client. The client identifier then is received, via the control site data block, from the control site. Upon receipt of the client identifier, the first site data clock is transmitted to the client. In preferred embodiments, the first site data block has both the client identifier and first site identification data.

Preferred embodiments of the invention are implemented as a computer program product having a computer usable medium with computer readable program code thereon. The computer readable code may be read and utilized by the computer system in accordance with conventional processes.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF PREFERRED EMBODIMENTS

Figure 1:
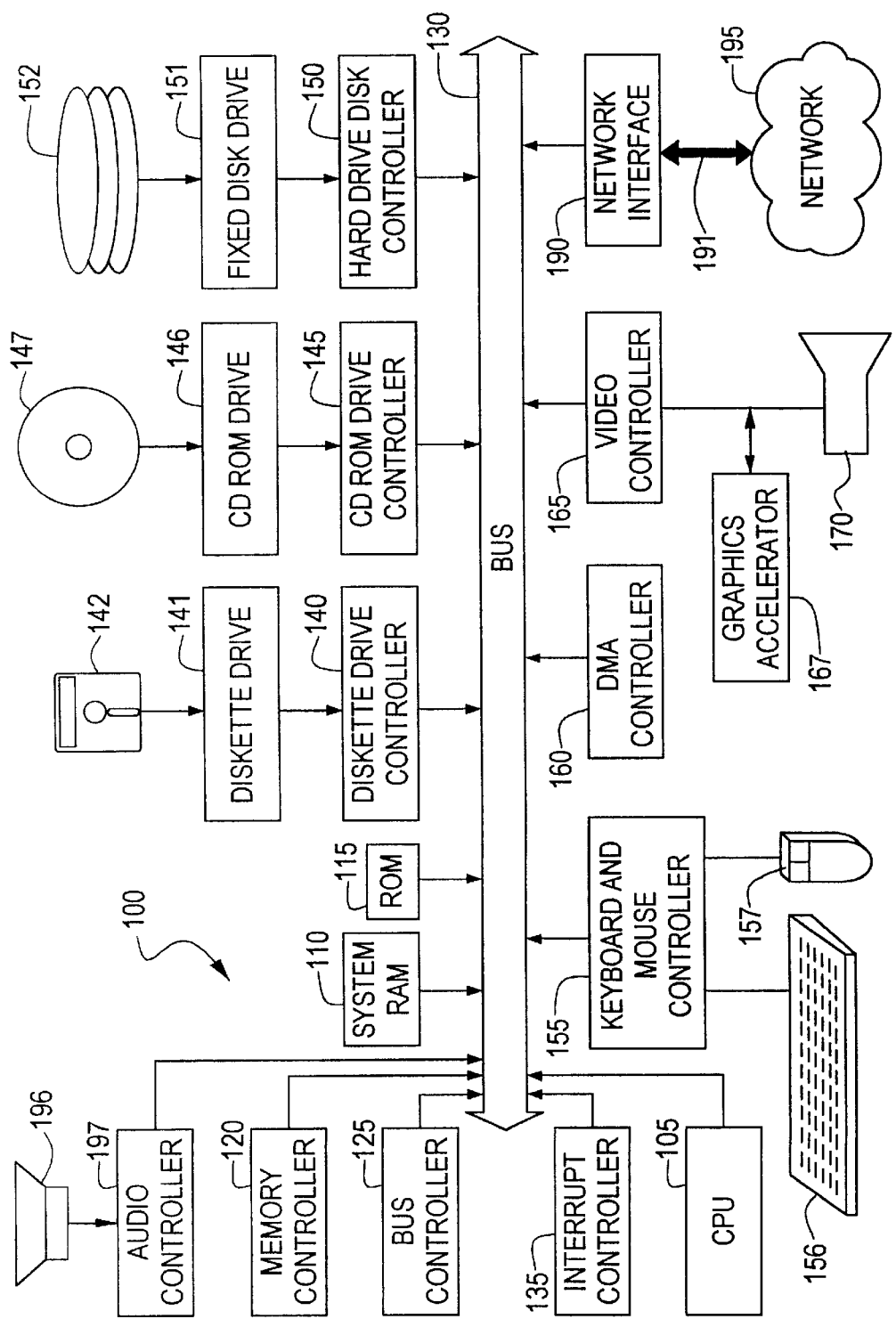
FIG. 1 schematically shows the system architecture of an exemplary computer system on which preferred embodiments of the invention may be implemented.

FIG. 1 illustrates the system architecture for an exemplary computer system 100, such as an IBM THINKPAD 701® computer (distributed by International Business Machines of Armonk, New York), on which the disclosed method and apparatus for identifying clients accessing network devices may be implemented. The exemplary computer system of FIG. 1 is discussed for descriptive purposes only, however, and should not be considered a limitation of the invention. Although the description below may refer to terms commonly used in describing particular computer systems, the described concepts apply equally to other computer systems, including systems having architectures that are dissimilar to that shown in FIG. 1.

The computer 100 includes a central processing unit (CPU) 105 having a conventional microprocessor, random access memory (RAM) 110 for temporary storage of information, and read only memory (ROM) 115 for permanent storage of read only information. A memory controller 100 is provided for controlling system RAM 110. A bus controller 125 is provided for controlling a bus 130, and an interrupt controller 135 is provided for receiving and processing various interrupt signals from the other system components.

Mass storage may be provided by known non-volatile storage media, such as a diskette 142, a digital versatile disk (not shown), a CD-ROM 147, or a hard disk 152. Data and software may be exchanged with the computer system 100 via removable media, such as the diskette 142 and the CD-ROM 147. The diskette 142 is insertable into a diskette drive 141, which utilizes a diskette drive controller 140 to interface with the bus 130. Similarly, the CD-ROM 147 is insertable into a CD-ROM drive 146, which utilizes a CD-ROM drive controller 145 to interface with the bus 130. Finally, the hard disk 152 is part of a fixed disk drive 151, which utilizes a hard drive controller 150 to interface with the bus 130.

User input to the computer 100 may be provided by a number of devices. For example, a keyboard 156 and a mouse 157 may be connected to the bus 330 by a keyboard and mouse controller 155. An audio transducer 196, which may act as both a microphone and a speaker, is connected to the bus 130 by audio controller 197. It should be obvious to those reasonably skilled in the art that other input devices, such as a pen and/or tablet and a microphone for voice input, may be connected to computer 100 through bus 130 and an appropriate controller. A direct memory access (DMA) controller 160 is provided for performing direct memory access to system RAM 110. A visual display may be generated by a video controller 165, which controls a graphics accelerator 167 and a display device 170.

A network adapter 190 also may be included to enable the computer system 100 to be interconnected to a network 195 via a network bus 191. The network 195, which may be a local area network (LAN), a wide area network (WAN), or the Internet, may utilize general purpose communication lines that interconnect a plurality of network devices.

The computer system 100 preferably is controlled and coordinated by operating system software, such as the WINDOWS NT® operating system (available from Microsoft Corp., of Redmond, Wash.). Among other computer system control functions, the operating system controls allocation of system resources and performs tasks such as process scheduling, memory management, networking, and I/O services.

Figure 2:
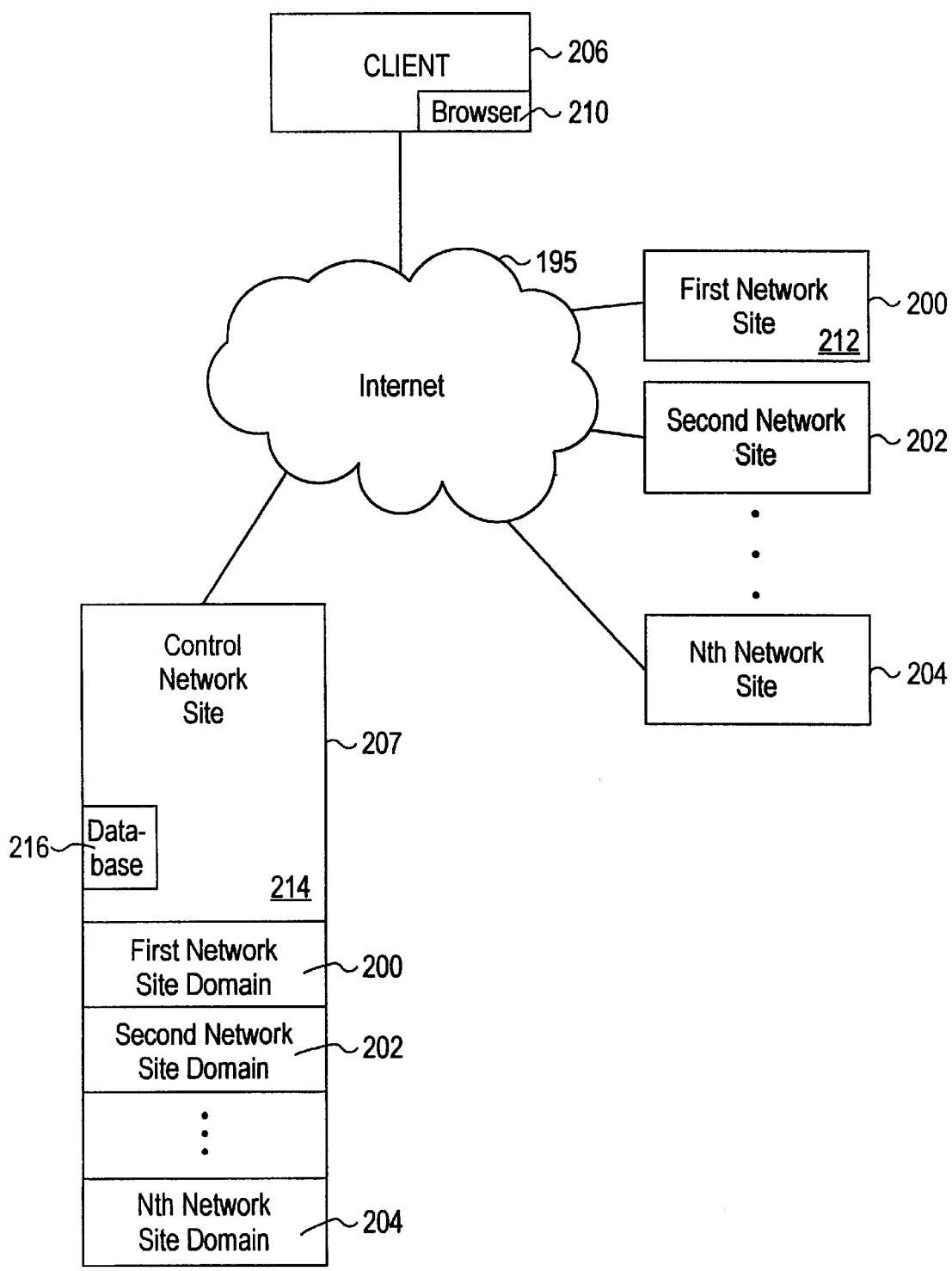
FIG. 2 schematically shows a network arrangement that may be utilized with preferred embodiments of the invention.

FIG. 2 schematically shows a network arrangement that may be utilized with preferred embodiments of the invention. More particularly, a plurality of network sites (designated as first network site 200, second network site 202, and Nth network site 204) are in communication with a client computer system ("client 206") and a control network site ("control site 207") via the network 195 (e.g., the Internet). The control site 207 preferably includes a control server 214 with non-volatile memory for maintaining a database 216 having information relating to the client 206 and each of the network sites 200–204. In a similar manner, each of the network sites 200–204 preferably includes respective network site servers.

In preferred embodiments, the network sites 200–204 and client 206 communicate via the World Wide Web (the "web"). Accordingly, the client 206 may be a computer system having browser software (e.g., Netscape Navigator™, hereinafter "browser 210"), while each of the network sites may be web sites that each share a common sub-domain. For example, the first network site 200 defines a first domain 200, the second network site 202 defines a second domain 202, and the Nth network site 204 defines an Nth domain 204. In accordance with preferred embodiments of the invention, each network site may be distributed across more than one (hardware) server. For example, the first network site 200 preferably is located on a first server 212 and on the control server 214. In alternative embodiments, each network site is located on a single server. For clarity, each domain and their respective network sites are referred to herein by the same reference number. Accordingly, by way of example, the first network site and first domain both are referred to by reference number 200.

Figure 3:
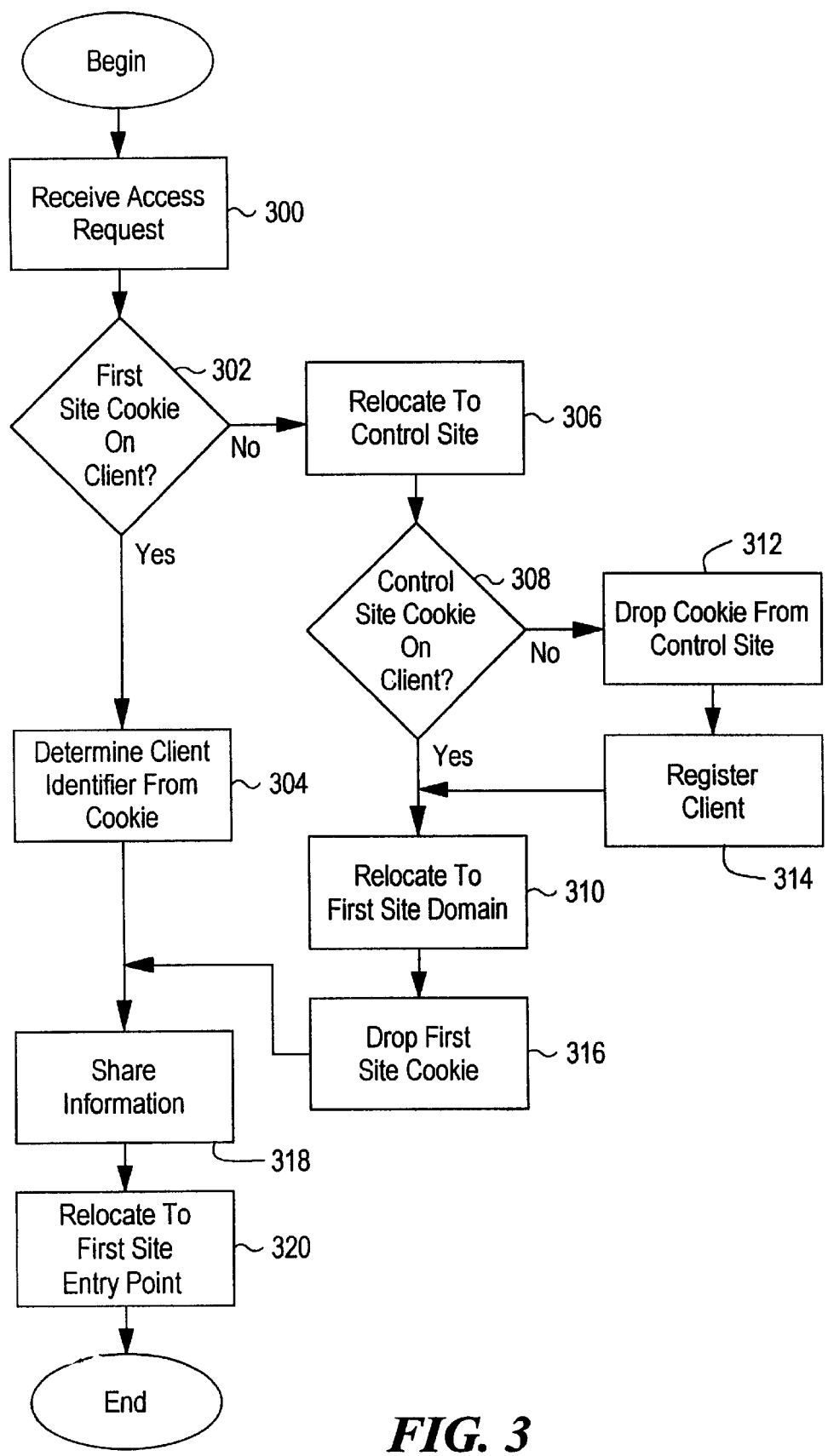
FIG. 3 generally shows the steps utilized in preferred embodiments to share information relating to clients accessing one or more network sites.

FIG. 3 generally shows the steps utilized by preferred embodiments to share information relating to clients 206 accessing one or more of the network sites 200–204. This process enables each network site to access information relating to the client 206 ("client information") from the database 216 (on the control server 214) in a manner that is not readily apparent to the user of the client 206. Each server may utilize the information in any number of ways such as, for example, to display a user specific greeting with the user's name on a web page, or to display advertisements for products or services that are related to known interests of the user.

The process begins at step 300 in which the client 206 requests access to the first network site 200. Although the first network site 200 is discussed, the principles relating to this process can be applied to such a request received by any of the other network sites. Once the request is received by the first network site 200, then the process continues to step 302 in which the first network site 200 interacts with the client 206, in a conventional manner, to determine if the browser 210 includes a first site cookie (i.e., first network site data block) from the first network site 200. As is known in the art, the browser 210 may include a first site cookie if that browser 210 had accessed the first site at some earlier time and the first site transmitted (a/k/a "dropped") a cookie to the browser 210 for subsequent retrieval by the first network site 200.

If at step 302 it is determined that the browser 210 includes a first site cookie, then the process continues to step 304 in which a client identifier is extracted from the first site cookie. The client identifier may be any indicia, character string, or other identifying data that uniquely identifies the client 206. Based upon the client identifier, information may be ascertained about the client 206 from the database 216 (discussed in greater detail below with reference to step 318 and FIG. 6).

If, however, it was determined at step 302 that the browser 210 did not include a first site cookie, then the process continues to step 306 in which the browser 210 is redirected (also referred to as "relocated") from the first network site 200 to the control site 207 (i.e., from the first domain 200 to the control site domain 207). This may be performed by transmitting a first message from the first network site 200 to the client 206 having a relocate command, a "find_user" command that instructs the control site 207 to find information relating to the client 206, transient verification identifiers (passwords) negotiated between the first server 212 and the control server 214, and information indicating that the commands were issued by the first network site 200.

Receipt of the first message by the client 206 first causes the client 206 to relocate to the control site 207 (i.e., the control domain) and then, when in the control site domain 207, to direct the find_user command and first network site information to the control site 207. Upon receipt of the find_user command and first network site information, the control site 207 responsively executes a plurality of steps (on behalf of the first network site 200) that further implement preferred embodiments of the invention. One of those steps causes the control site 207 to responsively interact with the client 206, in a conventional manner, to determine if the browser 210 includes a control site cookie (i.e., control site data block) from the control site 207 (step 308).

If it is determined at step 308 that the client 206 includes a control site cookie, then the client identifier is extracted from the control site cookie. The process then continues to step 310, in which the client 206 is relocated to the first site domain, and the client identifier is dropped by the client browser 210 for transmission to the first network site 200. As discussed below, the client identifier preferably is transmitted via a direct Internet connection between the control site 207 and the first network site 200. Although not necessary, the connection may be encrypted by means of conventional encrypting techniques to ensure the security of the transmitted data, and to protect the identity of the client 206 if the case of information transmitted by relocation. A new control site cookie that is substantially identical to the control site cookie on the browser 210 may be transmitted and stored ("dropped") on the client browser 210 if the located control site cookie was not a permanent cookie.

In preferred embodiments, the client 206 is relocated to a web site in the first domain 200 (at step 310) that is delivered from the control server 214. To that end, the control site 207 transmits a second message to the client 206 with a client identifier identifying the client 206, other transient unique identifiers (i.e., passwords) negotiated between the first site 212 and the control site 214 for security purposes, and the address of a web site in the first domain 200 that is delivered from the control server 214. For example, if the first network site 200 is in a domain "first.com", then the control site 207 preferably directs the client 206 to a site at "control_server.first.com" which, in preferred embodiments, is delivered from the control server 214. This web site preferably includes additional functionality to drop a first network site cookie onto the browser 210 (step 316, discussed in greater detail below). Among other reasons, this web site preferably is delivered from the control server 214 so that the control server 214 can control the process of dropping a first network cookie onto the client 206. Additionally, implementing most of the functionality on the control server 214 simplifies system setup and operation of the network sites 200–204. For example, software malfunctions (i.e., "bugs") that may develop typically can be fixed more easily by a service provider if the software is loaded onto a server that is accessible to the service provider. In addition, this arrangement significantly minimizes software complexity on the servers 200–204. In alternative embodiments, the client 206 is relocated to a web site (in the first site domain) that is delivered from the first server 212.

If at step 308 it is determined that the client 206 does not include a control site cookie, then the process continues to step 312 in which the control site cookie is dropped, in accord with conventional processes, onto the client 206 by the control site 207. The control site cookie preferably includes a client identifier identifying the client 206, and control site information indicating that the control cookie was dropped by the control site 207. The client identifier may be generated by the control site 207 after it is determined that the client 206 does not include a control site cookie. A plurality of client records then may be initialized in the database 216 and may be retrieved upon receipt of the client identifier. The records may include any information about the client 206 that is ascertained by the control site 207.

Once the control site cookie is dropped and the client identifier is generated, then the client 206 may register with the control site 207 (step 314). This step, however, may be performed either before, during, or after step 312. The client 206 may register by submitting information via a conventional template that is generated with common gateway interface scripts ("CGI scripts"). For example, the user of the browser 210 may complete fields of a form requesting the user's name, address, hobbies, etc . . . . Information retrieved in this manner may be stored in the database records that were created for the client 206. Any other additional data that can be retrieved by the control site 207 may be stored in the records. For example, the browser 210 and version type of the client 206, or the background color of the client's display may be stored in the client records.

The process then continues to step 310 (discussed above), in which the client 206 is relocated to the first site domain (either on the control server 214 or the first server 212). Once in the first site domain, the process continues to step 316 in which a first site cookie is generated and dropped onto the client browser 210. As noted above, the first site cookie preferably is generated by the control site server. The first site cookie may include the client identifier and a first site identifier.

The process continues to step 318 in which information about the client 206 is shared between the control server 214 and the first network site 200. In preferred embodiments, this information is transmitted via an encrypted Internet connection between the control site 207 and the first network site 200. In other embodiments in which the control site 207 and the first network site 200 are connected via non-Internet means such as, for example, on the same server, in a local area network, or via a direct modem to modem connection, this information may be transmitted directly between the sites in a conventional manner without an Internet connection. Among the information that may be transmitted is the information in the database 216 (e.g., the user's name and hobbies) accessed via the client identifier, and data retrieved by the first network site 200 relating to the client's use of the first network site 200. For example, the latter information may include web pages accessed by the client 206 while accessing the first network site 200, the length of time spent at such web pages, and answers to miscellaneous queries posed by the first network site 200. Upon receipt from the first network site 200, the control site 207 may access and store the information in the records for the client 206 in the database 216. It should be emphasized, however, that this information transfer preferably is two-directional in that information is transmitted to and from both sites 200 and 207. See FIG. 6 for a summary of the steps utilized by one embodiment of the invention to transfer data from the control site 207 to a requesting network site.

The process continues to step 320 in which the client 206 is relocated from the portion of the first network site 200 that drops the first network site cookie (e.g., control_server.first.com) to an entry point in the first web site. This entry point preferably is the web page to which the client 206 initially requested access. This preferably is performed by the control server 214 generating and transmitting a third message to the client 206 with commands that cause the client 206 to relocate to the first site entry point. As suggested above, information still may be shared between the control site 207 and the first network site 200 during and after the time that the client 206 is relocated to the first site entry point.

In the process shown in FIG. 3, cookies are dropped from each of the respective network sites only when the browser 210 is in such respective domains. For example, the control site cookie is dropped from the control site domain 207 and not from the first domain 200. In a similar manner, the first cookie is dropped from the first domain 200 and not from the control domain. Execution of the process shown in FIG. 3 thus enables each of the web sites to drop cookies onto the browser 210 even if the browser 210 is configured to receive cookies from no other domains other than the domain in which the browser 210 is currently accessing. Information therefore may be efficiently and reliably shared across multiple network sites in different domains via the control site 207. The process shown in FIG. 3 thus may be executed to maintain information relating to a plurality of clients 206 accessing any one of the network sites that include the disclosed information gathering and sharing functionality.

Under expected operating conditions, the time required to perform the steps between step 300 (receiving the access request) and step 320 (relocating to the first site entry point) should be relatively short such as, for example, less than one second. Accordingly, the process preferably is not readily apparent to the user of the client 206 who, in preferred embodiments, sees no indication that client information is being gathered.

Figure 4:
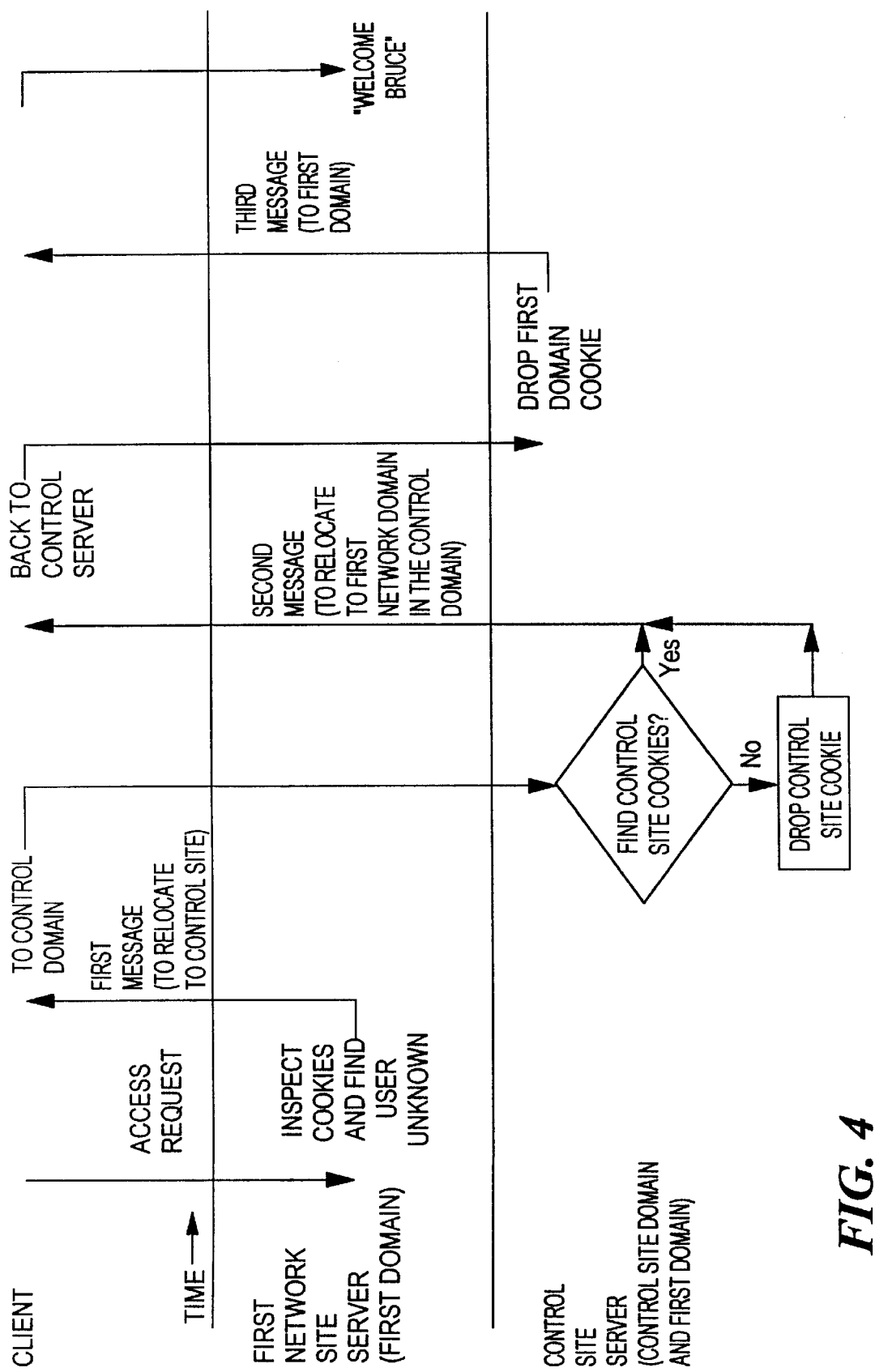
FIG. 4 is a time diagram generally showing the steps shown in FIG. 3 in the embodiment in which the first network site is distributed across a first network site server and a control site server.

FIG. 4 is a time diagram generally showing many of the steps summarized in FIG. 3 in the embodiment in which the first network site 200 is distributed across the first server 212 and the control server 214. As can be deduced by merely inspecting the figure, the client 206 first makes the access request and is redirected to the control site server via the first message. Once at the control site server, then it is determined if the control site cookie is included in the browser 210. If the control site cookie is not included in the client 206, then the control site cookie is dropped onto the client 206. If the control site cookie is included on the client 206, then the second message is directed to the client 206 to relocate to the first domain 200 on the control server 214 so that the first network site 200 may drop its cookie onto the client 206. After the first site cookie is dropped, then the third message is sent to the client 206 causing the client 206 to relocate to an entry point in the first domain 200 on the first site server. In the example shown in FIG. 4, the first network site 200 has ascertained the user's name ("Bruce", in this example) and includes the indicia "Welcome Bruce" in the HTML code of the accessed web page. It should be noted that although some of the steps of the process shown in FIG. 3 are omitted from FIG. 4, those steps still are performed by preferred embodiments of the invention.

Figure 5:
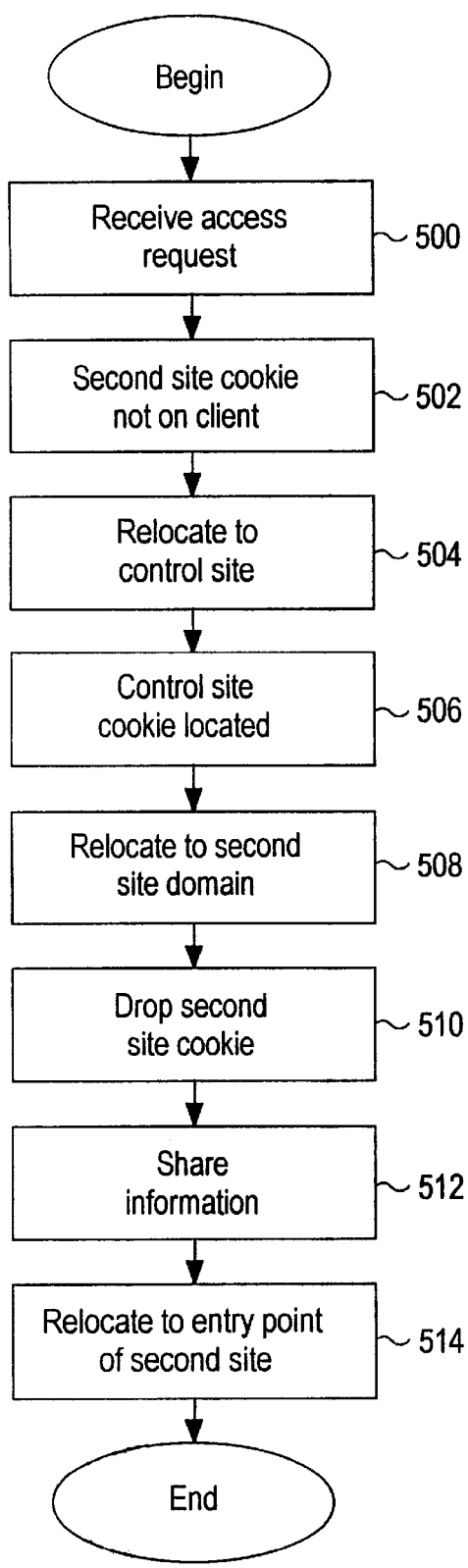
FIG. 5 generally shows the steps utilized in preferred embodiments when a second network site is accessed by a client that has previously completed the process shown in FIG. 3.

FIG. 5 generally shows the steps utilized in preferred embodiments when the second network site 202 is accessed by a client 206 that has previously completed the process shown in FIG. 3. The process begins at step 500 in which the client 206 requests access to the second network site 202. The second network site 202 then interacts with the client 206, in a conventional manner, and determines that the client 206 does not include a second site cookie (step 502). The second network site 202 consequently relocates the client 206 to the control site 207 via a relocate message having commands and second site information that is substantially identical to those in the first message to the first network site 200 (step 504). The control site 207 then locates the cookie in the client 206 (step 506) and consequently relocates the client 206 to the second site domain (step 508). In preferred embodiments, the client 206 is relocated to the second site domain that is delivered by the control site server.

Once in the second site domain 202, the second site cookie (which includes the client identifier received from the control site 207) is dropped onto the client 206 (step 510). The process then continues to step 512 in which information is shared between the control site 207 and the second network site 202. Finally, the client 206 is relocated to the entry point in the second site at step 514. Each of these steps in FIG. 5 preferably are implemented in a manner that is substantially identical to the implementation of the corresponding steps in the process shown in FIG. 3.

In alternative embodiments of the invention, the cookies are configured to include client information. Accordingly, this embodiment does not require use of the database 216 in the control site 207 since a network site being accessed can directly extract the client information from the its cookie. In yet other embodiments, the system is implemented across other types of networks that do not utilize the web.

Figure 6:
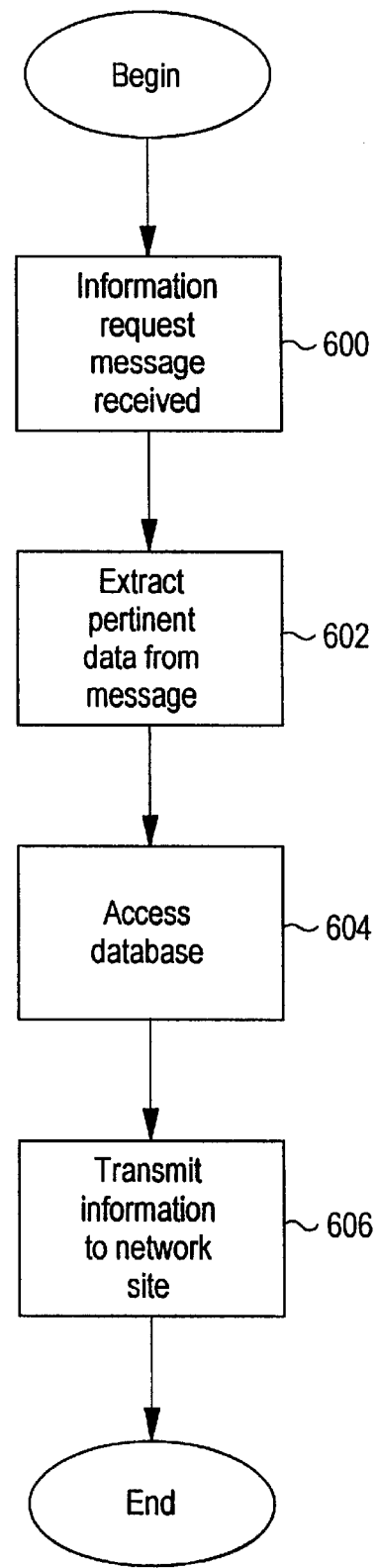
FIG. 6 generally shows the steps utilized in one embodiment of the invention to retrieve and transmit client information from the control site to a requesting network site.

As noted above, information preferably is transmitted between the control site 207 and the network site 200–204 to which access is requested (see, for example, step 318 in FIG. 3). FIG. 6 generally shows the steps utilized in one embodiment of the invention to retrieve and transmit client information from the control site 207 to a requesting network site. The process begins at step 600 in which an information request is transmitted by one of the network sites being accessed to the control site 207. Among other data, the information request preferably includes the client identifier and a network site identifier identifying the network site making the request.

In response to receipt of the information request, both the client identifier and the network site identifier are extracted from the message by the control site 207 (step 602). The client identifier then may be used to locate all information stored in the database 216 relating to the client 206 (step 604). Once the information is located, it is transmitted to the requesting network site (step 606). In some embodiments, however, only selected information may be transmitted to certain network sites. In such embodiments, the network site identifier is utilized by the control site 207 to filter information that is directed to a requesting site. In particular, certain client records may be marked so that the data in those records can be transmitted to selected network sites only.

Preferred embodiments of the invention may be implemented in any conventional computer programming language. For example, some embodiments may be implemented in a procedural programming language (e.g., "C") or an object oriented programming language (e.g., "C++"). Preferred embodiments are programmed in the Oracle PU/QL language. Portions of code may be programmed one either or both the control site 207 and the network sites 200–204. In preferred embodiments, aside from conventional code that is utilized with the preferred client identifying system, most of the functionality of the inventive system is programmed on the control server 214 except for the code for generating and transmitting the first message (redirecting the client 206 to the control site 207), and the code for processing information received by one of the network sites from the control site database 216. Other embodiments of the invention may be implemented as preprogrammed hardware elements, or other related components.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over the network (e.g., the Internet 195 or World Wide Web).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

I claim:

1. A method of identifying a client accessing a first network site, the client being in communication with the first network site and a control site via a network, the method comprising:

A. receiving a request from the client to access the first network site;
   B. in response to receipt of the request, determining if the client includes a first site data block;
   C. if it is determined that the client does not include the first site data block, then controlling the control site to produce a control site data block having control site identification data and a client identifier;
   D. transmitting the control site data block from the control site to the client;
   E. transmitting the client identifier from the control site to the first network site; and
   F. upon receipt of the client identifier by the first network site, controlling the first network site to transmit the first site data block to the client, the first site data block having both the client identifier and first site identification data.

2. The method as defined by claim 1 wherein the first network site is a World Wide Web site in a first network site domain and the first site data block is a cookie.

3. The method as defined by claim 2 wherein the control site is a World Wide Web site in a control site domain and the control site data block is a cookie.

4. The method as defined by claim 3 wherein step D comprises:

D1. directing the client to the control site domain.

5. The method as defined by claim 3 wherein step F comprises:

F1. directing the client to the first network site domain.

6. The method as defined by claim 1 wherein the client identifier includes in IP address of the client.

7. The method as defined by claim 1 wherein the client includes a browser.

8. The method as defined by claim 1 further including:

G. transmitting client information between the first network site and the control site.

9. The method as defined by claim 1 further including:

H. if it is determined at step B that the client includes the first site data block, then retrieving a copy of the first site data block from the client;
   I. extracting the client identifier from the first site data block;
   J. transmitting the client identifier from the first network site to the control site;
   K. retrieving client information from a storage medium associated with the control site, the client information being retrieved by utilizing the received client identifier;
   L. transmitting the retrieved client information from the control site to the first network site.

10. The method as defined by claim 1 wherein the first network site is in a first domain, and the control site is in a control domain, the first domain being distributed across at least two servers.

11. The method as defined by claim 10 wherein the control site is implemented on a server, the server further including the first network site, the control data block being transmitted when the client is in the control domain, the first site data block being transmitted when the client is in the first domain.

12. The method as defined by claim 1 further including:

M. if it is determined at step B that the client includes the first site data block, then controlling the first network site to retrieve a copy of the first site data block from the client, the first site data block including client information;
   N. extracting the client identifier and client information from the first site data block.

13. The method as defined by claim 1 wherein a second network site is in communication with the network, the method further comprising:

J. receiving a request from the client to access the second network site;
   K. in response to receipt of the request, determining if the client includes a second site data block;
   L. if it is determined that the client does not include the second site data block, then transmitting a message to the control site with the client identifier;
   M. controlling the control site to utilize the client identifier to locate client information;
   N. transmitting the located client information from the control site to the second network site.

14. The method as defined by claim 1 wherein the first site identification data includes an address of the first network site.

15. An apparatus for identifying a client accessing a first network site, the client being in communication with the first network site and a control site via a network, the apparatus comprising:

a receiver for receiving a request from the client to access the first network site;
   means for determining, in response to receipt of the request, if the client includes a first site data block;
   means for controlling the control site to produce a control site data block having control site identification data and a client identifier if it is determined that the client does not include the first site data block;
   means for transmitting the control site data block from the control site to the client;
   means for transmitting the client identifier from the control site to the first network site; and
   means for controlling the first network site to transmit the first site data block to the client after receipt of the client identifier by the first network site, the first site data block having both the client identifier and first site identification data.

16. The apparatus as defined by claim 15 wherein the first network site is a World Wide Web site in a first network site domain and the first site data block is a cookie.

17. The apparatus as defined by claim 16 wherein the control site is a World Wide Web site in a control site domain and the control site data block is a cookie.

18. The apparatus as defined by claim 17 wherein the means for transmitting the control site data block comprises:

means for directing the client to the control site domain.

19. The apparatus as defined by claim 17 wherein the means for controlling comprises:

means for directing the client to the first network site domain.

20. The apparatus as defined by claim 15 wherein the client identifier includes in IP address of the client.

21. The apparatus as defined by claim 15 wherein the client includes a browser.

22. The apparatus as defined by claim 15 further including:

means for transmitting client information between the first network site and the control site.

23. The apparatus as defined by claim 15 further including:
   means for retrieving a copy of the first site data block from the client if it is determined that the client includes the first site data block;
   means for extracting the client identifier from the first site data block;
   means for transmitting the client identifier from the first network site to the control site;
   means for retrieving client information from a storage medium associated with the control site, the client information being retrieved by utilizing the received client identifier;
   means for transmitting the retrieved client information from the control site to the first network site.

24. The apparatus as defined by claim 15 wherein the first network site is in a first domain, and the control site is in a control domain, the first domain being distributed across at least two servers, the control data block being transmitted when the client is in the control domain, the first site data block being transmitted when the client is in the first domain.

25. The method as defined by claim 24 wherein the control site is implemented on a server, the server further including the first network site.

26. The apparatus as defined by claim 15 further including:
   means for controlling the first network site to retrieve a copy of the first site data block from the client if it is determined that the client includes the first site data block, the first site data block including client information;
   means for extracting the client identifier and client information from the first site data block.

27. The apparatus as defined by claim 15 wherein a second network site is in communication with the network, the apparatus further comprising:
   means for receiving a request from the client to access the second network site;
   means for determining if the client includes a second site data block in response to receipt of the request;
   means for transmitting a message to the control site with the client identifier if it is determined that the client does not include the second site data block;
   means for controlling the control site to utilize the client identifier to locate client information;
   means for transmitting the located client information from the control site to the second network site.

28. The apparatus as defined by claim 15 wherein the first site identification data includes an address of the first network site.

29. A computer program product for use on a computer system for identifying a client accessing a first network site, the client being in communication with the first network site and a control site via a network, the computer program product comprising a computer usable medium having computer readable program code thereon, the computer readable program code comprising:
   program code for receiving a request from the client to access the first network site; program code for determining, in response to receipt of the request, if the client includes a first site data block;
   program code for controlling the control site to produce a control site data block having control site identification data and a client identifier if it is determined that the client does not include the first site data block;
   program code for transmitting the control site data block from the control site to the client;
   program code for transmitting the client identifier from the control site to the first network site; and
   program code for controlling the first network site to transmit the first site data block to the client after receipt of the client identifier by the first network site, the first site data block having both the client identifier and first site identification data.

30. The computer program product as defined by claim 29 wherein the first network site is a World Wide Web site in a first network site domain and the first site data block is a cookie.

31. The computer program product as defined by claim 30 wherein the control site is a World Wide Web site in a control site domain and the control site data block is a cookie.

32. The computer program product as defined by claim 31 wherein the program code for transmitting the control site data block comprises:
   program code for directing the client to the control site domain.

33. The computer program product as defined by claim 31 wherein the program code for controlling comprises:
   program code for directing the client to the first network site domain.

34. The computer program product as defined by claim 29 wherein the client identifier includes in IP address of the client.

35. The computer program product as defined by claim 29 wherein the client includes a browser.

36. The computer program product as defined by claim 29 further including:
   program code for transmitting client information between the first network site and the control site.

37. The computer program product as defined by claim 29 further including:
   program code for retrieving a copy of the first site data block from the client if it is determined that the client includes the first site data block;
   program code for extracting the client identifier from the first site data block;
   program code for transmitting the client identifier from the first network site to the control site;
   program code for retrieving client information from a storage medium associated with the control site, the client information being retrieved by utilizing the received client identifier;
   program code for transmitting the retrieved client information from the control site to the first network site.

38. The computer program product as defined by claim 29 wherein the first network site is in a first domain, and the control site is in a control domain, the first domain being distributed across at least two servers.

39. The computer program product as defined by claim 38 wherein the control site is implemented on a server, the server further including the first network site, the control data block being transmitted when the client is in the control domain, the first site data block being transmitted when the client is in the first domain.

40. The computer program product as defined by claim 29 further including:
   program code for controlling the first network site to retrieve a copy of the first site data block from the client if it is determined that the client includes the first site data block, the first site data block including client information;

program code for extracting the client identifier and client information from the first site data block.

41. The computer program product as defined by claim 29 wherein a second network site is in communication with the network, the computer program product further comprising:

program code for receiving a request from the client to access the second network site;

program code for determining if the client includes a second site data block in response to receipt of the request;

program code for transmitting a message to the control site with the client identifier if it is determined that the client does not include the second site data block;

program code for controlling the control site to utilize the client identifier to locate client information;

program code for transmitting the located client information from the control site to the second network site.

42. The computer program product as defined by claim 29 wherein the first site identification data includes an address of the first network site.

43. A method of identifying a client accessing a first network site, the client being in communication with the first network site and a control site via a network, the control site receiving a first message from the first network site, the first message indicating that the client does not include a first site data block, the method comprising:

after receipt of the first message, controlling the control site to produce a control site data block having control site identification data and a client identifier;

transmitting the control site data block from the control site to the client; and generating a second message for transmission from the control site to the first network site, the second message having the client identifier and commands for execution by the first to network site, the commands being selected so that after the commands are read by the first network site, the first network site transmits the first site data block to the client, the first site data block having both the client identifier and first site identification data.

44. The method as defined by claim 43 wherein both the first network site and the control site are World Wide Web sites.

45. The method as defined by claim 43 wherein the first network site is in a first domain, and the control site is in a control domain, the control site data block being transmitted to the client when the client is in the control domain.

46. The method as defined by claim 45 wherein the commands in the second message control the first network site to transmit the first site data block when the browser is in the first domain.

47. The method as defined by claim 43 wherein a second network site is in communication with the network, the control site receiving a third message indicating that the browser does not include a second data block, the method comprising:

controlling the control site to confirm that the client includes the control site data block;

if it is confirmed that the client includes the control site data block, transmitting client information from the control site to the second network site.

48. The method as defined by claim 47 further comprising:

if it is confirmed that the client includes the control site data block, generating a forth message for transmission to the second network site, the forth message including commands that are selected so that after received by the second network site, the second network site transmits the second site data block to the browser, the second site data block having both the client identifier and second site identification data.

49. The method as defined by claim 43 wherein a fifth message is received by the control site, the fifth message including the client identifier and a request for client information from the first network site, the method comprising:

utilizing the client identifier to locate the client information; and transmitting the located client information to the first network site.

50. An apparatus for identifying a client accessing a first network site, the client being in communication with the first network site and a control site via a network, the control site receiving a first message from the first network site, the first message indicating that the client does not include a first site data block, the apparatus comprising:

means for controlling the control site to produce a control site data block having control site identification data and a client identifier after receipt of the first message;

means for transmitting the control site data block from the control site to the client; and means for generating a second message for transmission from the control site to the first network site, the second message having the client identifier and commands for execution by the first network site, the commands being selected so that after the commands are read by the first network site, the first network site transmits the first site data block to the client, the first site data block having both the client identifier and first site identification data.

51. The apparatus as defined by claim 50 wherein both the first network site and the control site are World Wide Web sites.

52. The apparatus as defined by claim 50 wherein the first network site is in a first domain, and the control site is in a control domain, the means for transmitting the control site data block to the client including means for transmitting the control site data block when the client is in the control domain.

53. The apparatus as defined by claim 52 wherein the commands in the second message control the first network site to transmit the first site data block when the browser is in the first domain.

54. The apparatus as defined by claim 50 wherein a second network site is in communication with the network, the control site receiving a third message indicating that the browser does not include a second data block, the apparatus comprising:

means for controlling the control site to confirm that the client includes the control site data block;

means for transmitting client information from the control site to the second network site if it is confirmed that the client includes the control site data block.

55. The apparatus as defined by claim 54 further comprising:

means for generating a forth message for transmission to the second network site if it is confirmed that the client includes the control site data block, the forth message including commands that are selected so that after received by the second network site, the second network site transmits the second site data block to the browser, the second site data block having both the client identifier and second site identification data.

56. The apparatus as defined by claim 50 wherein a fifth message is received by the control site, the fifth message including the client identifier and a request for client information from the first network site, the apparatus comprising:

means for utilizing the client identifier to locate the client information; and means for transmitting the located client information to the first network site.

57. A computer program product for use on a computer system for identifying a client accessing a first network site, the client being in communication with the first network site and a control site via a network, the control site receiving a first message from the first network site, the first message indicating that the client does not include a first site data block, the computer program product comprising a computer usable medium having computer readable program code thereon, the computer readable program code comprising:

program code for controlling the control site to produce a control site data block having control site identification data and a client identifier after receipt of the first message;

program code for transmitting the control site data block from the control site to the client; and program code for generating a second message for transmission from the control site to the first network site, the second message having the client identifier and commands for execution by the first network site, the commands being selected so that after the commands are read by the first network site, the first network site transmits the first site data block to the client, the first site data block having both the client identifier and first site identification data.

58. The computer program product as defined by claim 57 wherein both the first network site and the control site are World Wide Web sites.

59. The computer program product as defined by claim 57 wherein the first network site is in a first domain, and the control site is in a control domain, the program code for transmitting the control site data block to the client including program code for transmitting the control site data block when the client is in the control domain.

60. The computer program product as defined by claim 59 wherein the commands in the second message control the first network site to transmit the first site data block when the browser is in the first domain.

61. The computer program product as defined by claim 57 wherein a second network site is in communication with the network, the control site receiving a third message indicating that the browser does not include a second data block, the computer program product comprising:

program code for controlling the control site to confirm that the client includes the control site data block;

program code for transmitting client information from the control site to the second network site if it is confirmed that the client includes the control site data block.

62. The computer program product as defined by claim 61 further comprising:

program code for generating a forth message for transmission to the second network site if it is confirmed that the client includes the control site data block, the forth message including commands that are selected so that after received by the second network site, the second network site transmits the second site data block to the browser, the second site data block having both the client identifier and second site identification data.

63. The computer program product as defined by claim 57 wherein a fifth message is received by the control site, the fifth message including the client identifier and a request for client information from the first network site, the computer program product comprising: program code for utilizing the client identifier to locate the client information; and program code for transmitting the located client information to the first network site.

64. A method of identifying a client accessing a first network site, the client being in communication with the first network site and a control site via a network, the method comprising:

receiving a request from the client to access the first network site;

in response to receipt of the request, determining if the client includes a first site data block;

if it is determined that the client does not include the first site data block, then generating an initial message with control commands for execution by the control site, the control commands being selected so that when executed by the control site, the control site first produces a control site data block having control site identification data and a client identifier, and then transmits the control site data block to the client;

receiving the client identifier from the control site; and upon receipt of the client identifier, transmitting the first site data block to the client, the first site data block having both the client identifier and first site identification data.

65. The method as defined by claim 64 wherein when executed by the control site, the commands cause the control site to determine if the client includes the control site data block.

66. The method as defined by claim 64 wherein the control site is in a control site domain, and the first network site is in a first domain, the first domain and control site domain being different, further wherein the client is in the browser domain when the control site transmits the control site data block.

67. The method as defined by claim 66 wherein the client is in the first domain when the first site data block is transmitted to the client.

68. The method as defined by claim 64 wherein the network is the World Wide Web.

69. The method as defined by claim 64 further including:

coupling with the control site;

receiving client information from the control site.

70. The method as defined by claim 64 further including:

if it is determined that the client includes the first site data block, then retrieving a copy of the first site data block from the client;

extracting the client identifier from the first site data block;

transmitting a client identifier message to the control site, the client identifier message having the client identifier and retrieval commands, when executed, the retrieval commands causing the control site to utilize the client identifier to retrieve client information from a storage medium; and receiving an information message from the control site, the information message including the retrieved client information.

71. The method as defined by claim 64 further comprising:
   retrieving a copy of the first site data block from the client if it is determined that the client includes the first site data block, the first site data block including client information;
   extracting the client identifier and client information from the first site data block.

72. An apparatus for identifying a client accessing a first network site, the client being in communication with the first network site and a control site via a network, the apparatus comprising:
   means for receiving a request from the client to access the first network site;
   means for determining if the client includes a first site data block in response to receipt of the request;
   means for generating an initial message with control commands for execution by the control site if it is determined that the client does not include the first site data block, the control commands being selected so that when executed by the control site, the control site first produces a control site data block having control site identification data and a client identifier, and then transmits the control site data block to the client;
   means for receiving the client identifier from the control site; and
   means for transmitting the first site data block to the client upon receipt of the client identifier, the first site data block having both the client identifier and first site identification data.

73. The apparatus as defined by claim 72 wherein when executed by the control site, the commands cause the control site to determine if the client includes the control site data block.

74. The apparatus as defined by claim 72 wherein the control site is in a control site domain, and the first network site is in a first domain, the first domain and control site domain being different, further wherein the client is in the browser domain when the control site transmits the control site data block.

75. The apparatus as defined by claim 74 wherein the client is in the first domain when the first site data block is transmitted to the client.

76. The apparatus as defined by claim 72 wherein the network is the World Wide Web.

77. The apparatus as defined by claim 72 further including:
   means for coupling with the control site; and
   means for receiving client information from the control site.

78. The apparatus as defined by claim 72 further including:
   means for retrieving a copy of the first site data block from the client if it is determined that the client includes the first site data block;
   means for extracting the client identifier from the first site data block;
   means for generating a client identifier message for transmission to the control site, the client identifier message having the client identifier and retrieval commands,
   when executed, the retrieval commands causing the control site to utilize the client identifier to retrieve client information from a storage medium; and
   means for receiving an information message from the control site, the information message including the retrieved client information.

79. The apparatus as defined by claim 72 further comprising:
   means for retrieving a copy of the first site data block from the client if it is determined that the client includes the first site data block, the first site data block including client information; and
   means for extracting the client identifier and client information from the first site data block.

80. A computer program product for use on a computer system for identifying a client accessing a first network site, the client being in communication with the first network site and a control site via a network, the computer program product comprising a computer usable medium having computer readable program code thereon, the computer readable program code comprising:
   program code for receiving a request from the client to access the first network site;
   program code for determining if the client includes a first site data block in response to receipt of the request;
   program code for generating an initial message with control commands for execution by the control site if it is determined that the client does not include the first site data block, the control commands being selected so that when executed by the control site, the control site first produces a control site data block having control site identification data and a client identifier, and then transmits the control site data block to the client;
   program code for receiving the client identifier from the control site; and
   program code for transmitting the first site data block to the client upon receipt of the client identifier, the first site data block having both the client identifier and first site identification data.

81. The computer program product as defined by claim 80 wherein when executed by the control site, the commands cause the control site to determine if the client includes the control site data block.

82. The computer program product as defined by claim 80 wherein the control site is in a control site domain, and the first network site is in a first domain, the first domain and control site domain being different, further wherein the client is in the browser domain when the control site transmits the control site data block.

83. The computer program product as defined by claim 82 wherein the client is in the first domain when the first site data block is transmitted to the client.

84. The computer program product as defined by claim 80 wherein the network is the World Wide Web.

85. The computer program product as defined by claim 80 further including:
   program code for coupling with the control site; and
   program code for receiving client information from the control site.

86. The computer program product as defined by claim 80 further including:
   program code for retrieving a copy of the first site data block from the client if it is determined that the client includes the first site data block;
   program code for extracting the client identifier from the first site data block;
   program code for generating a client identifier message for transmission to the control site, the client identifier message having the client identifier and retrieval commands,
   when executed, the retrieval commands causing the control site to utilize the client identifier to retrieve client information from a storage medium; and program code for receiving an information message from the control site, the information message including the retrieved client information.

87. The computer program product as defined by claim 80 further comprising:

program code for retrieving a copy of the first site data block from the client if it is determined that the client includes the first site data block, the first site data block including client information; and program code for extracting the client identifier and client information from the first site data block.

88. The computer program product as defined by claim 80 wherein the first network site is in a first domain, and the control site is in a control domain, the first domain being distributed across at least two servers.

89. The computer program product as defined by claim 80 wherein the control site is implemented on a server, the server further including the first network site, the control data block being transmitted when the client is in the control domain, the first site data block being transmitted when the client is in the first domain.

90. A method of identifying a client accessing a first network site, the client being in communication with the first network site and a control site via a network, the first network site receiving a request to access the first network site and responsively determining that the client does not include a first network site data block, the method comprising:

A. determining if the client includes a control site data block;

B. if it is determined that the client does not include the control site data block, then controlling the control site to produce a control site data block having a client identifier, and then transmitting the control site data block from the control site to the client;

C. if it is determined that the client includes the control site data block, then extracting the client identifier from the control site data block;

D. transmitting the client identifier from the control site to the first network site; and E. upon receipt of the client identifier by the first network site, controlling the first network site to transmit the first site data block to the client, the first site data block having the client identifier.

91. The method as defined by claim 90 wherein the first network site defines a first domain, and the control site defined a control domain, wherein step E comprises:

E1. directing the client to the first domain.

92. The method as defined by claim 91 wherein step B comprises:

B1. directing the client to the control domain.

93. A method of identifying a client accessing a first network site, the client being in communication with the first network site and a control site via a network, the first network site receiving a request to access the first network site and responsively determining that the client does not include a first network site data block, the method comprising:

A. determining if the client includes a control site data block;

B. if it is determined that the client does not include the control site data block, then controlling the control site to produce a control site data block having a client identifier, and then transmitting the control site data block from the control site to the client;

C. if it is determined that the client includes the control site data block, then extracting the client identifier from the control site data block;

D. transmitting a message from the control site to the first network site, the message including the client identifier and commands that, when executed by the first network site, control the first network site to transmit the first site data block to the client, the first site data block having the client identifier.

94. The method as defined by claim 93 wherein the first network site defines a first domain, and the control site defined a control domain, wherein step B comprises:

B1. directing the client to the control domain.

* * * * *